(12) United States Patent
Jacobson

(10) Patent No.: US 7,890,359 B2
(45) Date of Patent: *Feb. 15, 2011

(54) METHOD FOR LINKING INSURANCE POLICIES

(76) Inventor: Neil L. Jacobson, 36-T Putnam Green, Greenwich, CT (US) 06830

( * ) Notice: Subject to any disclaimer, the term of this patent is extended or adjusted under 35 U.S.C. 154(b) by 0 days.

This patent is subject to a terminal disclaimer.

(21) Appl. No.: 12/661,680

(22) Filed: Mar. 22, 2010

(65) Prior Publication Data

US 2010/0223072 A1    Sep. 2, 2010

Related U.S. Application Data

(63) Continuation of application No. 10/200,808, filed on Jul. 23, 2002, now Pat. No. 7,685,007.

(51) Int. Cl.
*G06Q 40/00* (2006.01)
*G06Q 50/00* (2006.01)

(52) U.S. Cl. .............................. 705/4; 705/2
(58) Field of Classification Search .................... 705/4, 705/2

See application file for complete search history.

(56) References Cited

U.S. PATENT DOCUMENTS 1,634,240 A * 6/1927 Burke ........................... 283/54

OTHER PUBLICATIONS de Wit, An Analysis of Claim Experience in Private Health Insurance to Establish a Relation Between Deductibles and Premium Re-bates, 1977, Austin Bulletin, 9:257-266.*

* cited by examiner

*Primary Examiner*—Robert W Morgan
*Assistant Examiner*—Tran Nguyen
(74) *Attorney, Agent, or Firm*—Seymour Levine

(57) ABSTRACT

An insurance program that provides improved health care and longevity by emphasizing health improvement and maintenance. After a predetermined waiting period from the time health insurance is purchased, during which the health status of the insured is maintained or improved, the insured may link the health insurance policy with one or more other types of insurance policies, such as; life, disability, nursing home, etc. Throughout the life of the policy, portions of the premiums may be deposited in an escrow account, provided that the health of the insured is maintained or improved, which may be utilized to pay or help pay for the linked insurance and may also be utilized for retirement benefits.

5 Claims, 5 Drawing Sheets

METHOD FOR LINKING INSURANCE POLICIES

This a Continuation of application Ser. No. 10/200,808 filed Jul. 23, 2002 now U.S. Pat. No. 7,685,007 granted Mar. 23, 2010.

BACKGROUND OF THE INVENTION

1. Field of the Invention

The invention relates generally to health insurance and more specifically to a policy or policies involving the linkage of health insurance with life insurance, disability insurance, and other types of health related insurances.

2. Description of the Prior Art

In one of his more astute remarks, Mark Twain, perhaps the greatest pundit of all time, once pondered more than a century ago: "whether medicine is a science or merely an empirical means of earning a living out of the human race." There is no doubt that he would be even more dismayed at the state of affairs that the United States is in today in terms of the efficaciousness of its health care system that is helpless in the face of the epidemics of cancer, heart disease, diabetes, kidney failure, etc. that ravage the United States.

Thomas Edison, also of the nineteenth century and one of the more ingenious minds of all time, was a bit more optimistic in his evaluation of the outlook of the United States in terms of its health when he said that: "The doctor of the future will give no medicine, but will interest his patients in the care of the human frame, in diet, and in the cause and prevention of disease." Unfortunately, the future that Thomas Edison envisioned is not yet the present. Even worse, if Mark Twain were still alive, he most certainly would also include the insurance industry (along with medicine) in his original statement, where tens of thousands of products inundate the marketplace in an attempt to sell insurance policies on everything from the health and lives of children to life and burial insurance.

If the goal of health insurance is to provide for the maintenance if not the improvement of ones health through available medical means, and similarly the role of life insurance is to maintain the life of the insured then it is clear that neither of these products have succeeded in accomplishing what they were originally intended to accomplish.

Of the various life insurance, health insurance and related products that exist in the marketplace in the United States today, they can all be organized into a few general categories for purposes of comparison: Whole Life, Universal Life, Variable Life, Term Life, Second-To Die Life, Credit Life, Children's Life, Critical Illness, Guaranteed Issue Life, Burial, Accidental Death and Dismemberment, Dental, Medical savings Accounts, HMO's, PPO's, etc. Despite the wide assortment of available products, all of these various products may have their own disadvantages.

Some of these disadvantages are: Whole Life insurance has prohibitively high premium payments. Consequently, it has a comparatively lower "cash value". Payment schedules, surrender charges, and loan restrictions for this type of policy are also less adaptable.

Universal Life insurance may have increased mortality costs, high premiums and limitations on fees, charges, loans and also may have tax consequences. Term insurance, may not be renewable nor provide long term coverage. Additionally, its fixed premiums are for short terms and provide little or no cash surrender value.

Second To Die insurance is generally used to shield extremely large estates from inheritance taxes and as such requires extremely large premiums and face values to accomplish it's purpose.

Children's Life insurance is not a favored product, as it requires one to "bet" on their children's demise in order to collect on the policy and as such is not a preferred product in the insurance field.

Critical Illness insurance does not cover an insured's pre-existing illness, is subject to review by the insurance companies regarding compensatory payments and is not available to all.

Burial insurance by and large does not accrue a cash value, is not available to certain populations of persons such as those that are severely incapacitated, chronically ill or have specific medical conditions.

Accidental Death and Dismemberment insurance usually only applies to accidental deaths and dismemberment and not illnesses.

Likewise, other insurance products such as dental insurance, MSA's (Medical Savings Accounts), HMO's (Health Maintenance Organizations), PPO's (Preferred Provider Organizations), all have specific disadvantages of their own.

Even worse, it can be argued, that the various insurance products as they exist and are arranged today have a vested interest in the ill health of the insured rather than the opposite effect.

The reasoning behind this statement is rather easily understood if one were to consider that the insurance industry, as presently configured, would cease to exist if an epidemic of health and well being suddenly broke out. That is to say, the existence of physical and mental disease is, ironically, necessary to perpetuate the financial health of an insurance company and the continuous upward spiral of insurance reimbursements and premium increases that not only allows for but also insures the continued fiscal success of that insurance company.

The health insurance industry cannot profit optimally, or even prosper, may flourish, if a critical number of patients maintain their health. Unfortunately, the health insurance provider benefits from the eventual death of clients within an insurance group or category by the raising of these insurance rates in that category, in the same way a landlord does by raising the rent when an apartment is 'turned over' by a tenant. In fact, it is these deceased policyholders along with an expected increase in interest rates and the attrition of policy holders due to cancellations that actually drive up the fees for the rest of the policyholders in a category. These increased fees are necessary in order for the health insurance companies to maintain a profit margin.

The reasoning for the profitability of the health insurance industry holds true for the life insurance industry, except even more so. In life insurance, death benefit payouts to beneficiaries represent an even greater monetary loss for a life insurance company than health insurance losses do for a health insurance company. In turn, a life insurance company exacts a much greater increase in premiums to recoup lost revenues and insure profits.

It is unfortunate that in the present life insurance system, the patient must die in order for a death benefit to be paid to a beneficiary and the life insurance to realize a profit for its owner. In a like manner, the insured patient must become ill in order for the health insurance company to make a profit in the health insurance industry.

In a conversation with Dr. Gerald N. Epstein he suggested that insurance companies should recognize the benefits of holistic medicine. What is needed is a means for maintaining and improving the client's health so that a minimum number of health related expenses are incurred for each patient and such that the health insurance company can also thrive. What is needed is for a life insurance industry to create an insurance product that would function as a life-beneFIT™, in effect rewarding longevity instead of offering the insured a "viatical" settlement. What is needed is a way for both of these products, life insurance and health insurance, to be merged into one life-health insurance product. What is needed finally is an insurance policy that also behaves as a financial product and yields a positive "return" on the best investment of all, oneself and ones family. In this way the insurance company and the client can both share in their respective fiscal and physical health while betting on the same side for the first time.

SUMMARY OF THE INVENTION

In accordance with the invention, improved health care and longevity are realized through the utilization of an insurance program that emphasizes health improvement and maintenance. After a predetermined waiting period from the time health insurance is purchased, during which the health status of the insured is maintained or improved, the insured may link the health insurance policy with one or more other types of insurance policies, such as: life, disability, nursing home, etc. Throughout the life of the policy, portions of the premiums may be deposited in an escrow account, provided that the health of the insured is maintained or improved, which may be utilized to pay or help pay for the linked insurance and which may also be utilized for retirement benefits.

One object of the invention is to provide a method of extending life spans while also reducing the insured's incidence of disease.

Another object of the invention is to link health care, health insurance and life insurance and/or other types of insurance, such as disability and nursing home care, with each other in order to increase the quantity and quality of life spans.

A further object of the invention is to provide a means for extending the duration of life insurance and health insurance coverage.

An even further object of the invention is to minimize health care expenditures and life insurance death benefit payouts for policyholders and insurance companies.

A still further object of the invention is to provide a means for extending the duration of coverage and monetarily reducing health and life insurance premiums for a policyholder.

A still even further object of the invention is to extend the duration of coverage and reduce fee schedules for both the health and life insurance policies of a policyholder, in order to generate a consistent, continuous and increased source of customers and company profits from life and health insurance revenues.

And a still even further object of the invention is to provide affordable health insurance and financial security for those individuals, families and entities presently unable to afford basic health/life insurance.

Still other objects and advantages of the invention are: to provide for a life-benefit annuity for the policyholder, to fund a health and/or life insurance policy, to provide for a reverse viatical settlement, to provide for an incentive for physicians to keep patients healthy by providing a fiscal compensation for the additional attention provided to each patient, to provide for the generation of pro-rata insurance dividends that have not been previously scaled or adjusted for values in between set payouts, to create a method of producing a financial-insurance product that acts to produce extra funds and revenues for policyholders via savings on their complementary holistic alternative integrative (CHAI™) policies so that they may invest in shares of stock or pension funds in the CHAI™ insurance corporation instead of spending it on excess medical treatments that have been avoided via their adherence to the CHAI™ protocol, and to form an insurance company that is able to base individual life-health premium calculations for each policy holder on that individual policy holders own health/life status and not on that of a group of other clients and to create an insurance company product that can act to help a policy holder to maintain financial solvency via the eventual life-beneFIT™ payout at the end of the policy.

According to the present invention, the foregoing and other objects are met by a combinatorial blending of health insurance and other types of insurance such as life insurance. As such, any policyholder may experience increased health and reduced premiums for both health and life insurance policies by following predetermined, prescribed and specific regimens for disease prevention and health improvement.

Conversely, in accordance with the invention, a policyholder's related or linked health and life insurance policy premiums may rise commensurate to a negative finding deemed to be due to lack of compliance by the policyholder in the prescribed regime (i.e. smoking, drinking, the acquisition of an illicit drug addiction, tendencies towards obesity, or lack of appropriate or prescribed nutrition, supplements, exercise, meditation etc.). Exceptions to this might be due to some unforeseen problem in the absorption of one or more nutrients leading to one or more metabolic and/or physiologic disorders, an acquired, inherited, genetic or inborn error of metabolism/disorder that is not as readily amenable to prevention or intervention, or a physical accident or injury that substantially alters the physiology or anatomy of a patient, etc.

The benefits of the invention will become more apparent from the following description with reference to the drawings.

DESCRIPTION OF THE PREFERRED EMBODIMENT

Figure 1:
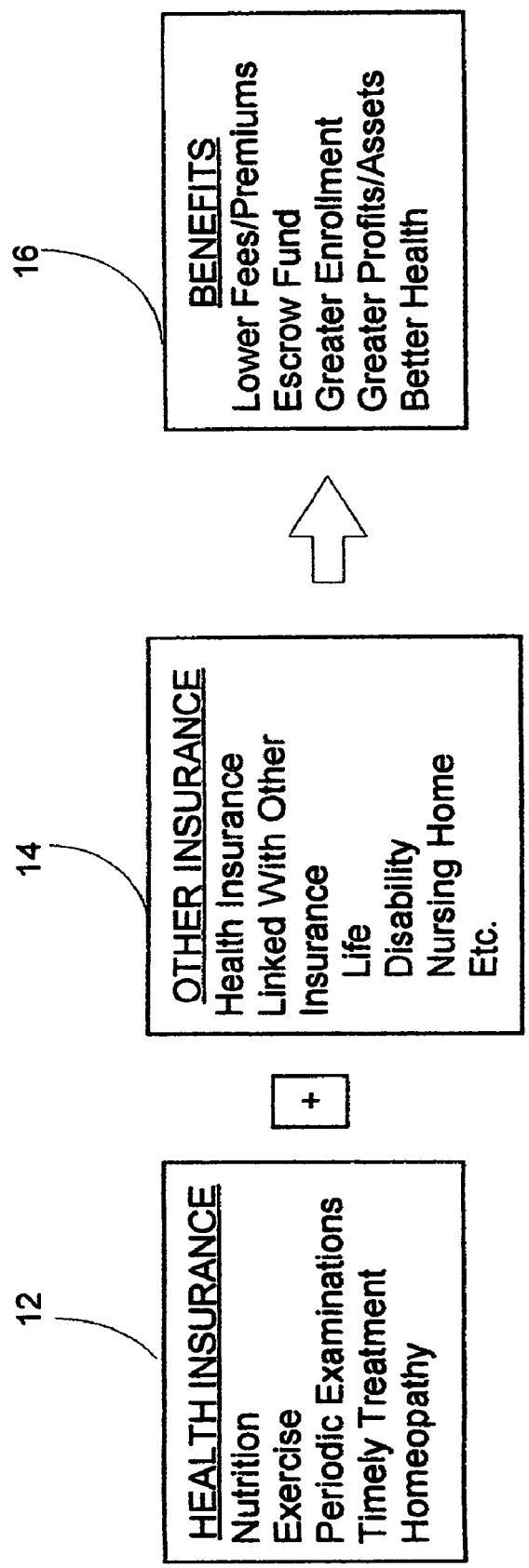
FIG. 1 is a block diagram which is useful for providing a brief explanation of the invention.

Referring to FIG. 1, when an individual purchases a complementary alternative integrative (CHAI™) health insurance policy 12 the purchaser is given a suggested regimen of nutrition and exercise and periodic examinations are scheduled. Should, as a result of an examination, a condition be detected that requires attention, a timely treatment to correct the condition will be given, which may include or be limited to nutrition, homeopathy, etc. After a predetermined period of time the health insurance may be linked with other insurance 14. These other insurance policies may include one or more policies that relate to longevity and quality of life, such as life insurance, disability insurance, nursing home insurance, etc. The linkage of the policies results in benefits 16 that may include lower insurance premiums for the insured, the establishment of an escrow fund for the deposit of premiums paid that exceed the lowered premiums, a greater enrollment in the program due to the lower premiums and the escrow fund, greater profits for the insurance company, better health for the insured, and possible retirement benefits for the insured, etc.

Figure 2:
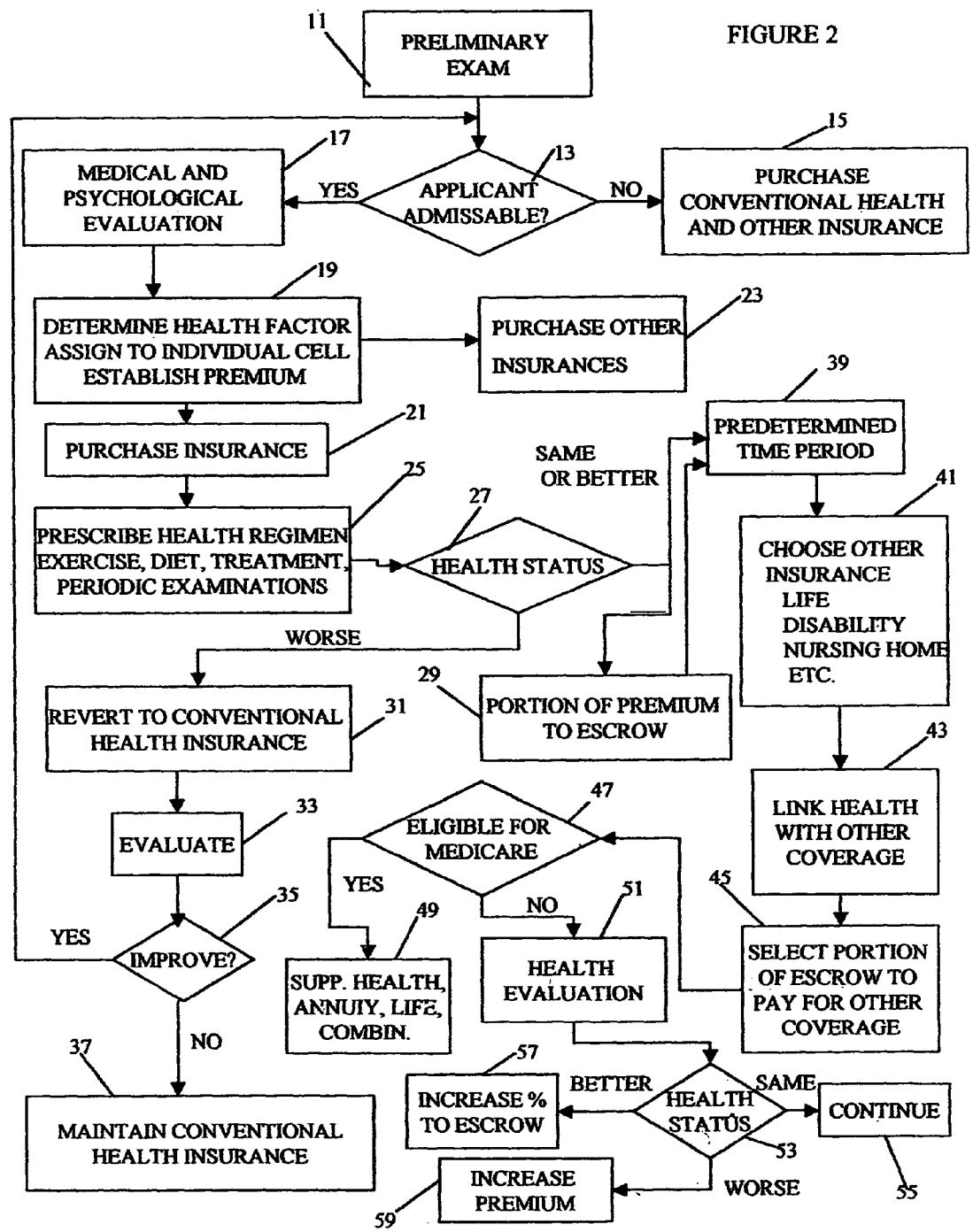
FIG. 2 is a diagram which is useful for providing a detailed explanation of the invention.

Refer now to FIG. 2, wherein a flow chart of a preferred embodiment of the invention is provided. When an individual applies for acceptance into a complementary alternative integrative (CHAI™) health insurance policy a preliminary exam 11 is given which establishes the applicant's past and present health records and the applicant's present physical fitness. These records and physical fitness are reviewed and a decision 13 is made if the applicant is preliminarily admissible to the CHAI™ program. Should the applicant be found to be inadmissable, conventional health, life, disability, nursing home, and/or other insurances 15 may be purchased. This initial rejection does not preclude the applicant from applying in the future should the applicant's health and/or physical fitness improve.

After acceptance to the CHAI™ insurance program, the formal approval process begins with a full medical and psychological evaluation 17 which may involve biometric health factors including but not limited to: biochemical, immunological, genetic, and proteomic biomarkers, blood chemistries for heart, liver, kidney, and lung functions, etc., psychological and neuropsychological findings, stress susceptibility factors, ecological and environmental conditions, etc. Upon completion of the evaluation, an initial health factor $F_0$ is determined for the applicant, the applicant is assigned to a separate and individual category for purposes of statistical analysis corresponding to the health factor $F_0$, and an initial health insurance premium $P_0$ consistent with the assigned closed cell and the factor $F_0$, is established 19. The applicant may then pay the premium and purchase the health insurance policy 21.

Though the premium may be paid after the initial health factor is determined, as discussed above, its payment is not restricted to be made after this event. A preliminary premium may be paid at any time prior to the determination of the initial health factor and individual category assignment and then subsequently adjusted.

Figure 3:
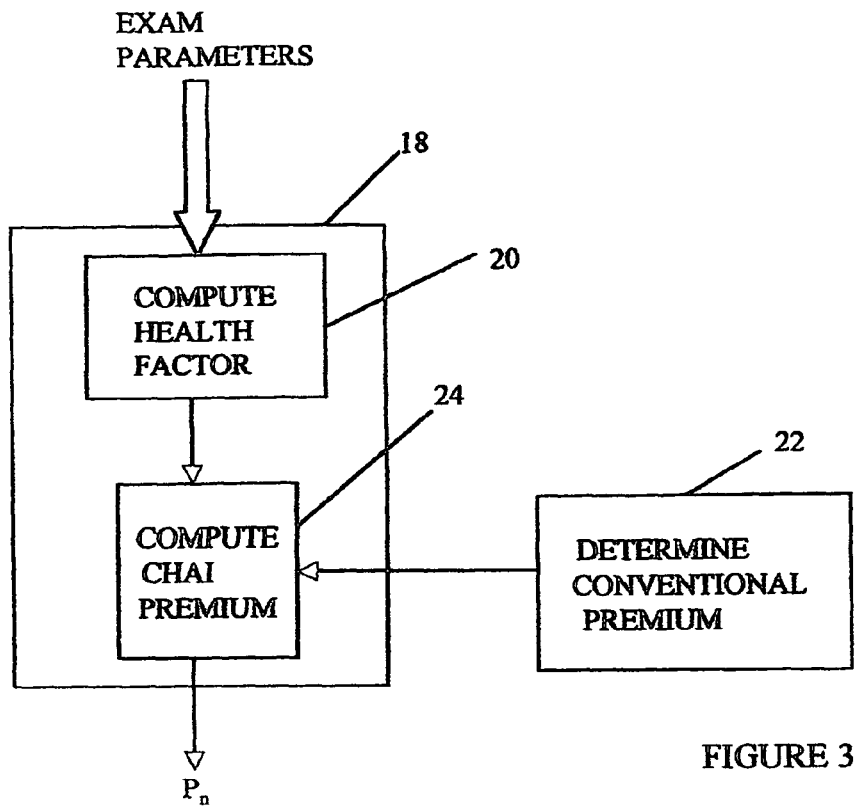
FIG. 3 is a diagram of a computer configuration for calculating a premium for an insurance program in accordance with the invention.

Computation of the initial health premium $P_0$ is shown in FIG. 3. Parameters are assigned to the results of each of the tests performed and entered into a computer 18 wherein the parameters are given appropriate weights and the health factor $F_0$ is computed 20. A premium for a conventional health insurance policy is determined 22 and entered into the computer wherein it is combined with the health factor $F_0$ to determine the CHAT health insurance premium 24.

The utilization of an individual category for purposes of statistical analysis deviates dramatically from the common statistical practice of insurance companies which base their actuarial determinations on the law of large numbers and the law of averages along with other laws of probability and statistics. The insurance companies basically rely on amortizing the financial losses from one (or several) of their policyholders against the revenues from thousands of other policyholders.

"While types of insurance vary widely, there primary goal is to allocate the risks of a loss from the individual to a great number of people. Each individual pays a "premium" into a pool, from which losses are paid out. Regardless of whether the particular individual suffers the loss or not, the premium is not returnable. Thus, when a building burns down, the loss is spread to the people contributing to the pool". (www.law-.cornell.edu/topics/insurance.html)

An individual category, on the other hand, allows an insurance company to evaluate or analyze a policyholder on an individual basis and not just solely as part of a large group, or aggregate. In this way an insurance company may ascertain a variety of relevant factors for a multitude of policyholders. For instance, an individual category can separate a more risky policyholder from within a group of other policyholders for purposes of assessing premiums, fees, discounts, penalties, etc. That is, this individualization protects the insurance company as well as its policyholders from absorbing financial liabilities from statistical outliers not otherwise distinguishable from within a large group.

Refer again to FIG. 2. The policy holder, of course, has the option 23 to purchase additional insurance, such as life, disability, nursing home, etc. These policies are independent of the health insurance policy at this time and are not linked. The two policies will remain unlinked for a pre-determined period.

After the health insurance has been purchased 21, the policyholder will receive periodic (monthly, quarterly, etc.) examinations 25 by the insurance company that will serve: (A) to examine the policyholder health wise, (B) to educate the policyholder regarding their medical/health conditions with respect to their specifically known genotypic and phenotypic makeup etc. and (C) to provide more general information to the policyholder in order for them to more easily develop a healthier lifestyle and longer lifespan. These may include recommendations and prescriptions for diet, exercise, and treatments deemed desirable.

After each examination a health status evaluation 27 is performed. Should the insured health status remain the same or improve a health insurance premium adjustment may be made in accordance with $$P_n = P_0 F_0 / F_n \text{ or } P_n = P_0 F'_n / F'_0$$

(depending upon whether the factor F increases with health improvement or decreases with health improvement, respectively) where: $P_0$ is the initial premium, $P_n$ is the premium after the health status evaluation, $F_0$, $F_0'$ are initial health factors, and $F_n$, $F'_n$ are health factors after the health status evaluation.

Figure 4:
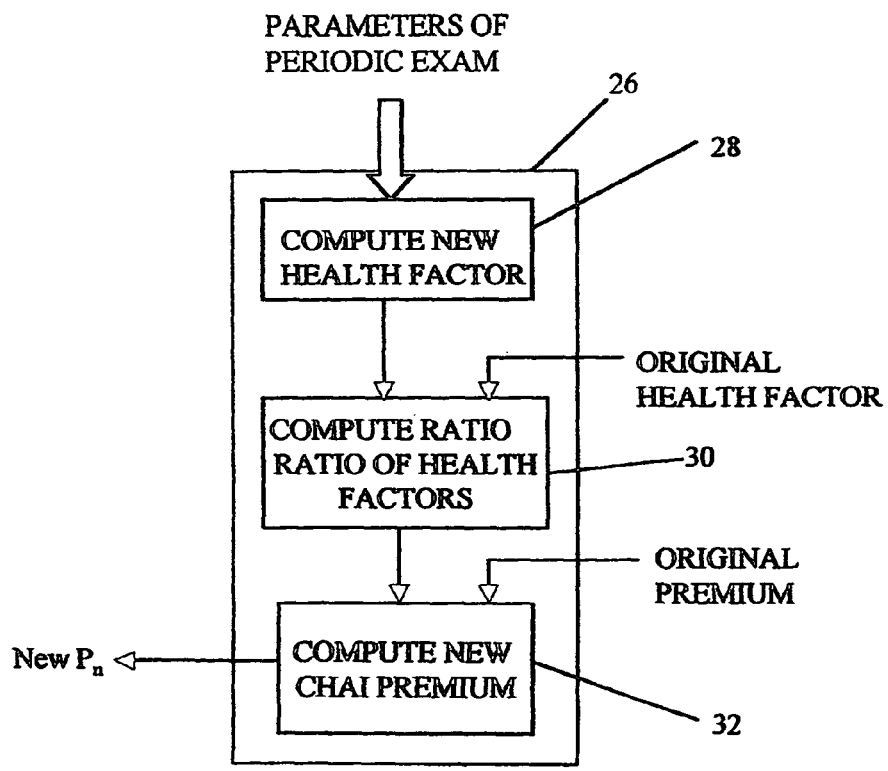
FIG. 4 is a diagram of a computer configuration for calculating an updated premium for an insurance program in accordance with the invention.

Health factor $F_n$ is determined as shown in FIG. 4. Health parameters of the periodic examination are coupled to a computer 26 wherein a new health factor $F_n$ is computed 28. This new health factor and the original health factors $F_0$, $F'_0$ are coupled to a ratio determinator 30 wherein the ratio of the two health factors is computed. The ratio of the two health factors and the original premium are coupled to a new premium calculator 32 wherein the new premium $P_n$ is calculated.

Refer again to FIG. 2. The insured continues to pay the initial premium $P_0$ and the difference $P_0 - P_n$ may be placed in an escrow fund 29, the purpose of which will be explained subsequently. This escrow fund may be administered by the company in a manner that is mutually beneficial to the company and the insured. Should the ratio of $F_n/F_0$ or $F'_0/F'_n$ be less than one, but not lower than a predetermined level, the insured may continue in the program with, perhaps, a modest increase in premium.

The insured's continued good health results in increased profits to the insurance company since payments for treatments are minimized, or even greatly reduced. Consequently, the insurance company retains a greater portion of the insurance premium. Thus, the company can thereby realize increased returns from premium investments and fees for the administration of the escrow account. These increased profits may be shared with the doctor and staff maintaining the health of the insured, thereby providing additional incentive for the maintenance of the insured's good health.

It should be recognized that the above is but one way of determining $P_n$ and the payments to the escrow fund and that other criteria may be employed to establish the $P_n$ and the deposit to the escrow fund.

Should it be determined, after an established number of health status evaluations 27, that the insured's health factor $F_n$, has deteriorated and crosses a predetermined level, the policy may revert to conventional health insurance 31 and whatever funds are in the escrow fund may be utilized to pay the increased premiums. The insured, however, need not be forever confined to conventional health insurance. Evaluations 33 of the insured's health may be performed periodically and should it improve 35 the insured's admissibility 13 to the CHAI™ program is once again evaluated. If, after the evaluation 33, the insured's health factor does not significantly improve, the insured may continue to maintain conventional health insurance 37.

If the insured maintains the health factor at $F_n$, $F'_n$, or better, for a predetermined time period 39, the insured may choose additional insurance coverage 41, which may be any life insurance of any type, disability insurance, nursing home insurance, or any other individual insurance and link this insurance with the health insurance 43. The predetermined period of time serves as both a transitional period for the patient in order to acquire the necessary tools to thrive, as well as a screening period for compliance to the CHAI™ program. This screening is similar to those protocols used by the Olympic Committee to screen potential non-compliance to the prescribed training program and as such serves as a buffer period for the CHAI™ insurance company so that they do not assume any unnecessary risk from a non-compliant policyholder during the predetermined trial period. If after this predetermined period of time 39 the insured maintains the health factor $F_n$, $F_n'$ thus indicating a satisfactory or good compliance with the program, the policyholder will be allowed to purchase interconvertible policies that link their health insurance with other types of insurance 43. Premiums for these policies may be based on the insured's health factor at the time the additional insurance is linked. The insured may pay the additional insurance premium as an added premium, may select a portion of the escrow fund to pay for the additional coverage 43, or may elect to pay for the additional coverage with a combination of added premium and a portion of the escrow fund 45.

Figure 5:
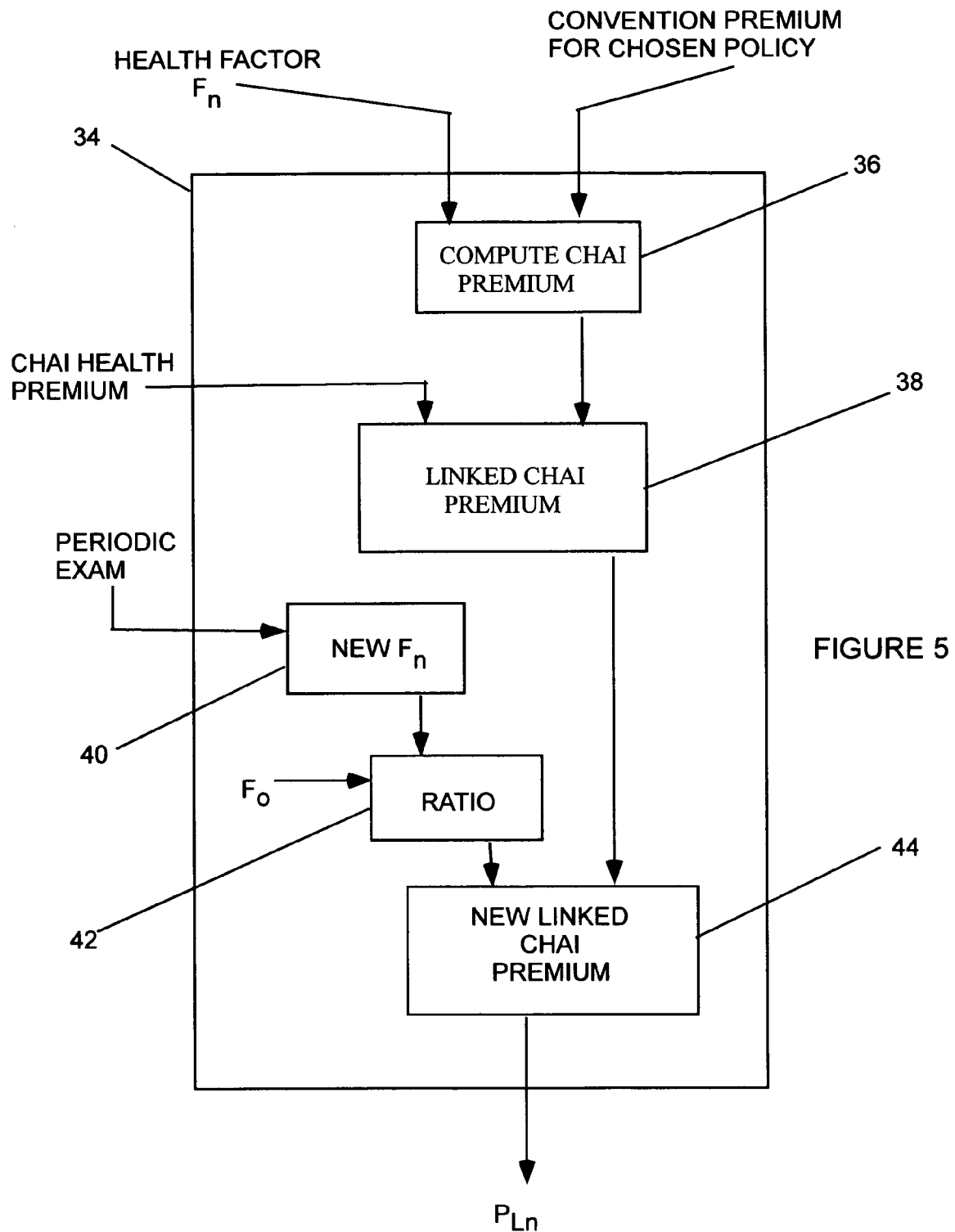
FIG. 5 is a diagram of a computer configuration for calculating a premium for linked policies in accordance with the invention.

Premiums for the linked policies are established as shown in FIG. 5. The health factor $F_n$ 40 at the time of linkage and the conventional premium for the policy chosen are coupled to a computer 34 wherein a CHAI™ premium for that policy is computed 36. This premium and the CHAI™ health insurance premium are coupled to a calculator 38 wherein the linked premium is determined. After each periodic examination a new health factor $F_n$ 40 is calculated and the ratio with respect to health $F_0$ computed 42. It is not necessary, however, for the reference to be the health factor $F_0$, any other health factor may be chosen. For example, the health factor at the time of linkage may be utilized as the reference health factor. The computed ratio and the linked CHAI™ premium computed in calculator 38 are coupled to a new CHAI™ premium calculator 44 wherein the new premium is established.

Refer again to FIG. 2. When the insured becomes eligible for Medicare 47 the escrow fund may be utilized to pay for supplemental health insurance and, if the insured so desires, establish an annuity or any other retirement benefit 49, or combinations thereof.

Prior to the insured becoming eligible for Medicare, the insured's periodic health status evaluations 51 are continued. After each evaluation a determination is made as to whether the insured's health status factor $F_n$ remains the same, has become better, or has become worse 53. If $F_n$ is the same, the program continues unchanged 55, if $F_n$ is better, an increased percentage of the health insurance premium is deposited in the escrow fund 57, and if $F_n$ is worse, the health insurance premium is increased and a decreased percentage of the life insurance premium 59 is deposited in the escrow fund or the deposits to the escrow fund cease, depending upon how low $F_n$ has fallen. Should the insured's health have deteriorated to such a degree that the health factor $F_n$ dictates a premium which is greater than the initial premium $P_0$ the insured may have the option of paying the increased premium or supplementing the initial premium with payments from the escrow fund or from cash values of any other insurance in the program.

With proper compliance and required "periodic" examinations, health-related expenses (comprising most of the outlay on the part of the policyholder and the company) dramatically diminish over time. However, while not totally eliminated, health insurance costs are substantially reduced during the policy coverage. Accordingly, there should be a direct relationship between the reduced premium $P_n$ and the policyholder's health. That is, if the insured's health is maintained or the insured becomes healthier (i.e. the insured's health factor increases), the percentage of health care revenues deposited in the escrow fund becomes greater.

Thus, in accordance with the invention, the policyholder's morbidity is lessened. Lessened morbidity and illness on the part of the policyholder leads to the lessened mortality of the policyholder. That is, favorable compliance on the part of the CHAI™ policyholder leads to a lessening of outpays (expenses, fees, surcharges) for medical benefits on the health insurance side and a lessening of future mortality charges on the life insurance side. The savings provided by a healthy policyholder can be invested into some form of a life-beneFIT™.

The increased revenues from the utilization of the CHAI™ insurance policy may provide for increased savings as well as profits for both the insured and the insurance company. As such this additional revenue due to the policyholders improved health status may be utilized to do any and all of the following:

(A) reduce the cost of the policyholders health insurance, (B) pay for the formation of a life insurance policy, (C) pay for additional life insurance in pro-rata amounts e.g.: increase the face amount of the policy, (D) pay for additional insurance policies (e.g.: dental, disability, medical savings account, catastrophic, long term care, etc.), (E) provide for a financial safety net for the insured as they age and are not able to provide an "earned" income (e.g.: life-beneFIT™, annuity, etc.), (F) provide for a means of profit sharing between the CHAI™ insurance company and the policy holder, (G) provide for a means of stock sharing between the CHAI™ insurance company and the policyholder, (H) provide for a means of further generating a profit by the CHAI™ insurance company, (I) reduce underwriting fees, (J) allow the policy holder to underwrite their own CHAI™ insurance policies, . . . .

Economically, the CHAI™ insurance policy makes sense if the old adage "an ounce of prevention is worth a pound of cure" prevails. That is, monthly or even quarterly testing of blood, urine and other body samples more than justify their own cost or expense especially if provided for hundreds of thousands of patients. This is especially true if one were to compare the price of today's acute crisis based interventive form of medicine that routinely bears the cost of heart by-pass surgery, or heart transplant, kidney transplant or chronic kidney dialysis treatment only to pass this expense on to all of the other policyholders by including a portion of this extra expense in their monthly premiums.

Even more so, this drastic reduction in disease incidence (and morbidity of diseases which do occur) by the CHAI™ insurance program would also greatly reduce the associated cost to an insurance company of chronic care illnesses and diseases (e.g.: kidney dialysis, organ transplants, etc.). This savings is perhaps as great or even greater in terms of total overall fiscal expenditures for an insurance company in that chronic care expenses are not one-time expenses but are continuous.

Additionally, the CHAI™ insurance system would also beneficially affect those costs and fees wrought by iatrogenic medicine via the use, or misuse, of drugs (e.g.: drug-drug toxicities are the $5^{th}$ leading cause of death in the United States), radiation and surgery. Iatrogenic disease alone is responsible for hundreds of thousands of deaths along with hundreds of millions of dollars in malpractice lawsuits paid out each and every year.

Essentially, the key to understanding the CHAI™ insurance program is a paradigm shift in the thinking of an insurance company (and treatment of a policyholder) that from an economic standpoint health insurance is much less costly than life insurance. That is, it is the unique feeling of the CHAI™ insurance program that health care insurance can drive life insurance. More aptly, health care savings drive life insurance savings. Stated in a different way, a pro-active rather than a passive stance in dealing with health insurance results in 'a disease avoided and a dollar saved'.

Because preventive medicine is known to have a cost-saving benefit over interventive medicine, when it is applied to the health insurance aspects of the CHAI™ program it has a net positive carry forward onto the future life insurance aspects of the CHAI™ program. As such it has a six-fold synergistic benefit for the patient as well as the insurance company:

First it saves the policyholder on the initial or primary level of disease incidence (and morbidity of pre-existing conditions). Second it lengthens the life of the policyholder. Thirdly, it saves the policyholder health fees. Fourth it allows the policyholder to participate in a life-beneFIT™ to advantageously apply those saved fees through the CHAI™ program. Fifth it saves the insurance company health insurance expenses. Sixth it saves the insurance company life insurance expenses (e.g.: mortality charges, etc.)

Thus, for example, if a policyholder with hypertension were to present this condition early on to a physician, a signal would be given for the immediate remedy of this disorder via the utilization of any and all forms of treatment available at the time (complementary, holistic, alternative, integrative, orthodox, or other means).

Consequently, for example, this same patient would hopefully be spared the full-blown development of hypertension which, if left unattended, might run it's further course to heart disease to diabetes to renal disease etc, and find his/her way back to health and longevity. As such, what the patient saved monetary on nipping this ailment in the bud would now be available to them in the form of "non-expense factors" that would be available to them for any of a number of possible investments for the policyholder and also the insurance company.

Some of the advantages of the CHAI™ plan include:
1) less illness for policyholder which would mean:
   less expenses paid out for health claims.
   more premiums able to be invested.
   more compounding of premiums/funds.
   policy is self-funding faster.
   policy endows faster.
   fewer claims paid for iatrogenic cases and thus more profit for the CHAI™ insurance company.
   greater longevity of life for policyholder and family.
   greater quality of life for policyholder and family.
   less loss of manpower hours for policyholder.
   less loss of manpower hours for employer.
   greater productivity for the policyholder.
   greater productivity for the employer.
   greater working lifespan for policyholder
2) longer life span of policyholder would mean:
   more premiums taken in over a greater period of time and thus more profit for the CHAI™ insurance company.
   more premiums taken in over an increased time span and thus more profit for the policyholder.
   more interest accrued over an increased time of paying into CHAI™ Life-Health insurance policies and thus more profit for the CHAI™ insurance company.
   more interest accrued over an increased time of paying into CHAI™ Life-Health insurance policies and thus more profit for the policyholder.
   less health insurance policy face values needed to be paid out throughout the years and thus more profit for the CHAI™ program (i.e. deferred morbidity charges).
   less life insurance policy face values needed to be paid out throughout the years and thus more profit for the policy holder. (i.e. deferred mortality charges)
   greater profits for policyholders since pension monies would not be invaded as soon and more of these monies would be available for policyholder investments.
   greater profits for corporations since pension monies would not be invaded as soon and more of these monies would be available for companies investments.
   policy is self-funding faster.
   policy is self-funding longer.
   later need for a nursing home or extended care facility
   more job life span for each policyholder
   a life-beneFIT™ can be paid (i.e: an annuity, stock options in CHAI™ insurance company, etc.)

This latter idea of generating stock options for the policyholder from within the CHAI™ insurance company as a possible life-beneFIT™ is another example of an aspect of the CHAI™ policy that deviates in thinking and philosophy from other existing policies. As such, many insurance companies in the marketplace today are faced with a conflict of interest from having shareholders (stock company) and policyholders (mutual company) co-existing within the same company. That is, showing a profit to one group necessitates showing a loss to the other. In the CHAI™ insurance company, the idea of policyholders as stockholders results in no conflict of interest as they are now one and the same and thus have the same vested interest: personal health (and longevity) for themselves along with a healthy profit for the company.

This is a dramatic divergence from the prevailing approach to both life and health insurance adopted by most other insurance companies thus far. That is, the traditional strategy for returning profits to their shareholders is based upon the supposition that an increase in profits is generated by a commensurate increase in premiums due in large part to an increase in the mortality, morbidity (or both) of their policyholders. For all parties involved (the insurance companies, the shareholders and the policyholders) this is a win-win-lose philosophy that befits a mostly economic incentive and one that predicates its survival on they're being a loser (the policyholder).

Moreover, if all things remain equal in a company's performance from one year to the next, then the only way for that company to show a profit to itself and its shareholders would be by cutting salaries, cutting administrative staff, cutting sales staff, etc.

Thus, creating a profit by this traditional method would represent another "win-lose" scenario since the maximum profit for any company can only be achieved when the most "cuts" are made. For those not in the "winning" position this represents an archaic and severe method of doing business. Witness the massive personnel layoffs that occur routinely near the end of a company's fiscal year in order to artificially drive up their own profits and stock prices.

However, cost-reduction can be an excellent tool to generate profits for a company if used gently and properly. For the CHAI™ insurance program, the proper implementation of this concept is that of optimal health for its health insurance policyholders so as to allow them to become favorable life insurance policyholders. Thus, the CHAT insurance program may therefore play an important new role in redefining relationships in business While cost-reduction is an important component within the CHAI™ insurance program, there must also be a means for arriving at a premium for a policyholder. A variety of methods presently exist for actuarially calculating insurance premiums. In actual practice, many companies prefer to derive their own formulas for each of their insurance products making them proprietary. These calculations are often based on specific information derived internally from their own life expectancy or mortality tables.

One method of generically calculating the net single premium (NSP) for a life insurance policy of duration n may be:

$$NSP = \sum_{t=1}^{n} F_t \frac{d_{x+t-1}}{L_x} r^t$$

$$r^t = \left(\frac{1}{1+i}\right)^t$$

where: t=time, x=age, F=face amount at time t, dx=number dying at age x, $L_x$=number living at age x, and i=interest rate. To the net single premium, one would add amounts to cover expenses and profits and taxes and margins for contingencies. If the d/L operator is replaced by a more generic likelihood of claim ratio, the formula is appropriate for calculating a net premium for any insurance, including a one year policy (personal communication Harold D. Skipper).

A traditional method of calculating the net cost (Traditional Net Cost) of a premium might be:

$$TNC_n = \frac{\sum_{t=1}^{n} P_t - \sum_{t=1}^{n} D_t - CV_n}{(F_n)(0.001)(n)}$$

where: n=number of years, $P_t$=premium at the begining of policy year t, $D_t$=dividend at the end of the policy year t, $CV_n$ cash value plus terminal dividend at the end of the policy year n, and $F_n$, death value at end of policy year n.

A method for determining the yearly price of protection for policy year t is given as:

$$YPP_t = \frac{(1+i)(P_t + (CV_{t-1}) - (CV_t + D_t)}{(F_t - CV_t)(0.001)}$$

where: $YPP_t$=the yearl price of protection, $P_t$=illustrated premium at beginning of policy year t, $CV_{t-1}$=the cash value plus terminal dividend at the end of policy year t−1, i=the assumed interest rate, $CV_t$=the cash value plus terminal dividend at the end of the year t, $D_t$=illustrated dividend at end of policy year t, and Ft=illustrated death benefit at the beginning of year t.

The above two formulas are discussed in: Black, K./Skipper, H., Life & Health Insurance13/E, ©2000, pp 309-310. Reprinted by permission of Pearson Education, Inc., Upper Saddle River, N.J.

In terms of health insurance a generic term which may be employed for determining a premium may be stated as follows:

Claims Earned/Premiums Earned

This ratio establishes the proportion of the premiums that is paid out in claims to the insured. In general, this ratio is a measure of the premiums returned to the insured in the form of claims. The higher the loss ratio, the greater is the percentage of the premiums returned to the insured.

If one were to analyze this formula and it's rationale, it would immediately become apparent that in health insurance as in life insurance, as they are presently structured, the winner is unfortunately actually also very much the loser.

That is, as it presently exists, in order to reclaim a substantial amount of the premiums paid in to a health policy, one need to become sick. And for these purposes, the more frequent and the sicker the better until one reaches the maximum amount of claims allowable per illness and/or per year. Obviously, illness is not a desired effect or outcome for any policyholder, but nonetheless this example still serves to illustrate the type of financial mechanism that health (and life insurance) operate under today.

With regards to the insurance companies side of the equation, if one were to carry this type of reasoning to its logical (or more aptly ill-logical) conclusion it might result in an insurance companies attempt to determine the probability of a patients illnesses and death occurring during a given year. This would, in effect, produce a means for predicting any and all expenses that a policyholder might incur on an insurance company during a given year. Extending this type of reasoning even further would result in attempting to predict the probability of a patients death at a given time during that year. Fortunately this morbid analysis would be even more incalculable and unpredictable. Moreover, what this invention does not attempt to do is to determine an exacting method of predicting the policyholder's morbidity or mortality. Rather it attempts to eliminate this type of analysis and as such take it out of the equation altogether.

As such this type of morbid thinking is in disparate terms with the philosophy of the CHAI™ insurance protocol where one who remains well is rewarded not only with good health and all of its related benefits, but with a certain monetary remuneration for the compliance that led to this good health and wellness. That is, the unspent monies (non-expense factors) that are saved by not being used unnecessarily for heath costs are now available for investing into the policyholders own life policy and hopefully eventual life-beneFIT™.

While the latter premium calculations were drawn upon to specifically illustrate a whole life, universal life or variable life policy as compared to a benchmark, it can be shown that any life insurance policy calculation may be utilized by the CHAI™ insurance program whether they are term, universal, variable, whole life or other types of life insurance policies.

In the case of variable life insurance this product is considered one of the most flexible forms of permanent life insurance due to its allowance for investments in pre-selected products outside of the fixed income market. As such, the accumulated cash value of this type of policy fluctuates with much greater volatility than other policies such as whole life or universal life. Hence, any additional gain in the cash value contained within this type of policy due to favorable stock-market conditions could therefore be utilized by the life-beneFIT™. portion of this policy at an accelerated rate.

However, if the stock-market conditions were unfavorable to a variable policyholder, then the life-beneFIT™ portion of their policy would still give them an additional financial edge over an ordinary variable policy from another insurance company.

Similarly, the CHAI™ insurance method would also work for annuities. While this latter type of insurance policy does not "pay out" until after a policyholder's death, one need only to examine this concept to see that longevity benefits both the insured and the insurance company. The premiums on this CHAI™ annuity would simply be adjusted downwards, if desired, to accommodate for the extra premiums projected to be paid in by a beneficiary over the length of this type of policy.

While any of the above, or other formulas not discussed, may be utilized in determining the premium for the life insurance component of the CHAI™ insurance policy, they should be utilized in the context of the entire CHAI™ protocol in order to calculate a CHAT premium $P_{CHAI}$, which in one form, may be given as follows:

$$P_{CHAI} = (P_{HI} + P_{LI})(F_0/F_n)$$

where $P_{HI}$ and $P_{LI}$ are the premiums for health insurance and life insurance, respectively, adjusted for the insured health factor at the time each insurance was first purchased, $F_0$ is a standard health factor, which may be the insured initial health factor, and Fn is the health factor after a scheduled examination.

Consider, for example, a CHAT policy with a premium of $250.00 per month, or $3000.00 per year. If just 50% is saved as a result of preventive health education and practice, then with only 100,000 policyholders this would represent a profit of approximately $150,000,000.00 per each year.

The point here being that if a policyholder is compliant, then a good percentage of their health insurance monies could be utilized towards other life-beneFITs. Moreover, if the CHAI™ policy is kept in force for a certain number of years and premium payments are maintained consistently, then compounding the savings of these premiums would result in an annuity or life beneFIT™ eventually being paid out to a policyholder despite the policyholder outliving the policy.

Another aspect of the invention may be accomplished through offering a certain amount to be paid out even if a life-health policy is outlived (exceeds maturity), or is carried or maintained via required payments for a stipulated number of years beyond the maturity date of the policy. At the insured's option, the face value may be paid and the policy terminated at any time after the maturity date. Thus, the CHAI™ policy, having matured, could pay the long-lived policyholder a form of an endowment, instead of becoming valueless as other non-CHAI™ life policies do at expiration.

Figure 6:
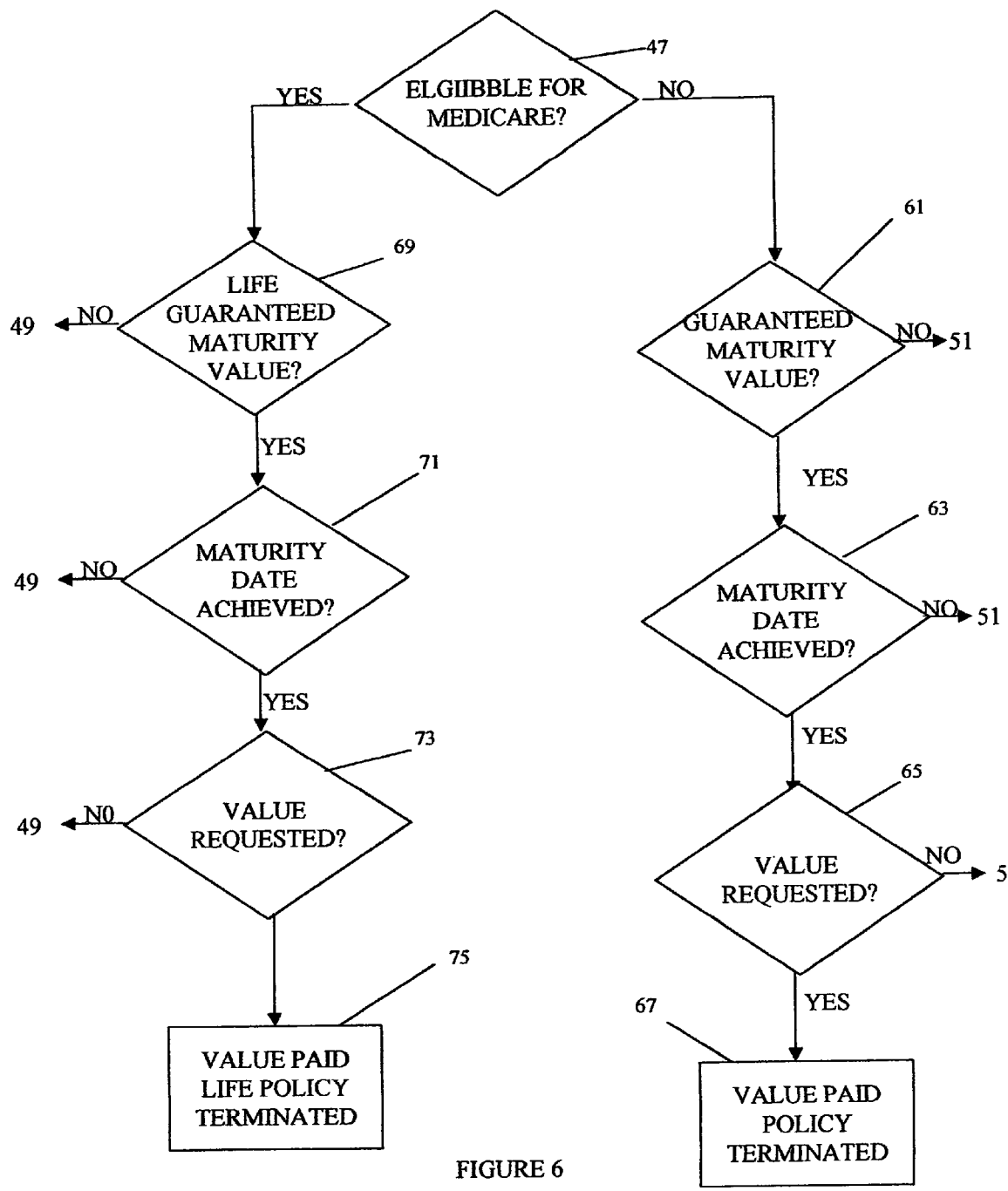
FIG. 6 is a flow chart of decisions to be made in regards to a guaranteed value policy which may be included in an insurance program in accordance with the invention.

This aspect of the invention is illustrated in FIG. 6, in which elements that are like elements in previous figures are assigned the same reference numeral. If it is determined that the insured is not eligible for medicare 47 a determination is then made 61 as to whether or not a policy of predetermined value, which may have a guaranteed maturity value, may be purchased 61. If such a policy has not been purchased the policy continues with periodic health examinations 51 (FIG. 2). Should a guaranteed predetermined value policy exist, a determination is made as to whether or not the maturity date has been achieved 63. If it has not, the policy continues with the periodic health examinations 51. Should it be determined that the maturity date has been achieved, the policy holder then may request to be paid the face value of the policy 65, the value of the policy is paid, and the policy is terminated 67. Should the policy holder choose not to cash in, the policy continues with the periodic health examinations 51. Thus the original health insurance policy that converted to a health-life insurance policy could simply convert once more to an annuity upon its full maturation.

A similar decision process ensues should the policy holder be eligible for Medicare. In this situation, the first question to be answered after the Medicare eligibility determination is whether the insured has a guaranteed maturity value life policy 69. If the insured does not posses such a policy, the insured continues with whatever combinations of supplemental health, life insurance, annuity, etc. 49 (FIG. 2) that are in effect. Should a maturity value life policy exist, it is then questioned if the maturity date has been achieved 71. If no, the insured continues with the existing combinations 49. If the maturity date has been achieved, it is then questioned if the insured has requested the value of the life insurance 73. If the insured has not requested the face value of the life insurance policy the continuation of the combinations 49. If a request for payment of the face value is made, the value is paid and life insurance policy is terminated 75 while the surviving policies in the combination 49 continue in effect.

An obvious extreme example of this, is that if a patient had maintained a policy for fifty or so years and also maintained good health and consistent good payments (which would hopefully diminish over time) then as the monies earned on the policy were most likely maximized over that fifty year or so year period, a significant portion of the death benefit could afford to be paid to this person.

The previous example is at the heart of this invention as this person would essentially be able "to have his cake and eat it too" (although hopefully not too much of it during his fifty-plus years of insurability). That is, they would have essentially won the conventional life insurance bet which ordinarily for any other insurance policy is "you bet your life that you will die young in order to win" (actually only your family or beneficiaries win).

With the "CHAI™" insurance policies one can live long and win at the same time since "to live long is to prosper and flourish, not only wealthwise but also Healthwise™. Thus if a policyholder followed the teachings of the CHAI™ insurance program and gained both health and longevity they could still be able to collect a significant annuity (this portion provided by their premiums, dividends, interest, etc.) paid in over the years. It is obvious that this person would be considered to be way ahead both financially and longevity wise.

While the invention has been described in its preferred embodiments, it is understood that the words that have been used are words of description rather than limitation and that changes may be made within the purview of the appended claims without departing from the true scope and spirit of the invention in its broader aspects.

What is claimed is:

1. A method capable of providing a health insurance program, comprising:
   a) receiving a request from an individual for insurance coverage;
   b) for a first time period, calculating, with a computer, a first premium for providing insurance coverage to the individual during the first time period based on a first health examination of the individual;
   c) charging the individual the first premium and providing insurance coverage to the individual during the first time period;
   d) for a second time period subsequent to the first time period, calculating, with the computer, a second premium for providing insurance coverage to the individual during the second time period based on a second health examination of the individual;
   e) determining, with the computer, that the second premium is less the first premium;
   f) charging the individual the first premium and providing insurance to the individual during the second time period;
   g) depositing the difference between the first premium and the second premium in an account crediting the individual, thereby providing a health maintenance incentive for the individual;
   h) establishing a predetermined time period after which the individual may elect one or more other insurance coverages comprising:
   guaranteed issue life insurance, credit life insurance, second to die life insurance, children's life insurance, critical illness insurance, burial insurance, dental insurance, health maintenance organization insurance (HMO's), preferred provider insurance (PPO's), medical savings accounts, catastrophic insurance and annuities.
   i) calculating, with a computer, a premium for the elected one or more other insurance coverage; and
   j) linking the elected one or more other insurance coverage with the insurance coverage upon payment of the premium for the one or more other insurance coverage.

2. A method capable of providing a life insurance program, comprising:
   a) receiving a request from an individual for insurance coverage;
   b) for a first time period, calculating, with a computer, a first premium for providing insurance coverage to the individual during the first time period based on a first health examination of the individual;
   c) charging the individual the first premium and providing insurance coverage to the individual during the first time period;
   d) for a second time period subsequent to the first time period, calculating, with the computer, a second premium for providing insurance coverage to the individual during the second time period based on a second health examination of the individual;
   e) determining, with the computer, that the second premium is less the first premium;
   f) charging the individual the first premium and providing insurance to the individual during the second time period;
   g) depositing the difference between the first premium and the second premium in an account crediting the individual, thereby providing a health maintenance incentive for the individual;
   h) establishing a predetermined time period after which the individual may elect one or more other insurance coverages comprising:
   guaranteed issue life insurance, credit life insurance, second to die life insurance, children's life insurance, critical illness insurance, burial insurance, dental insurance, health maintenance organization insurance (HMO), preferred provider insurance (PPO's), medical savings accounts, catastrophic insurance and annuities;
   i) calculating, with a computer, a premium for the elected one or more other insurance coverage; and
   j) linking the elected one or more other insurance coverage with the insurance coverage upon payment of the premium for the one or more other insurance coverage.

3. A method for providing insurance establishing a life benefit for the insured utilizing data coupled to a computer programmed to compute premiums to be paid for the insurance, the data derived from an examination comprising the steps of:
   a) examining an individual for a first time to establish first health factor data;
   b) providing the first health factor data to the computer for a calculation of a first premium;
   c) examining the individual for a second time, after a predetermined interval from the first time, to provide a second health factor data;
   d) providing the second health factor data to the computer for the calculation of a second premium;
   e) determining, with the computer, that the second premium is less than the first premium;
   f) the insured paying the first premium for insurance;
   g) depositing the difference between the first and second premiums into an account crediting the insured, thereby linking health and wealth and establishing a life benefit for the insured.

4. A method for providing insurance establishing a reverse viatical for an insured utilizing data coupled to a computer programmed to compute premiums to be paid for the insurance, the data derived from an examination comprising the steps of:
   a) examining an individual for a first time to establish first health factor data,
   b) providing the first health factor data to the computer for a calculation of a first premium;
   c) examining the individual for a second time, after a predetermined interval from the first time, to provide a second health factor data;
   d) providing the second health factor data to the computer for the calculation of a second premium;
   e) determining, with the computer, that the second premium is less than the first premium;
   f) the insured paying the first premium for insurance;
   g) depositing the difference between the first and second premiums into an account crediting the insured;
   h) establishing a guaranteed maturity value for the insurance;
   i) achieving the guaranteed maturity value in the account
   j) providing an option for the insured to request the maturity value, or purchase an annuity with the monies in the account, thereby providing a reverse viatical for the insured.

5. A method for providing insurance establishing a reverse viatical for an insured utilizing data coupled to a computer programmed to compute premiums to be paid for the insurance, the data derived from an examination comprising the steps of:

a) examining an individual for a first time to establish first health factor data;

b) providing the first health factor data to the computer for a calculation of a first premium;

c) examining the individual for a second time, after a predetermined interval from the first time, to provide a second health factor data;

d) providing the second health factor data to the computer for the calculation of a second premium;

e) determining, with the computer, that the second premium is less than the first premium;

f) the insured paying the first premium for insurance;

g) depositing the difference between the first and second premiums into an account crediting the insured;

h) providing an option for the insured including a request for credit in the account, applying the credit in the account to pay premiums for other insurance policies, purchasing other insurance policies and linking insurance policies, thereby providing a reverse viatical for the insured.

* * * * *